UNITED STATES PATENT OFFICE.

HARRY ESSEX AND IRWIN W. HUMPHREY, OF PITTSBURGH, PENNSYLVANIA, ASSIGNORS TO GULF REFINING COMPANY, OF PITTSBURGH, PENNSYLVANIA, A CORPORATION OF TEXAS.

PROCESS OF PURIFYING AMYL COMPOUNDS.

1,233,333.

Specification of Letters Patent.

Patented July 17, 1917.

No Drawing.  Application filed January 25, 1917.  Serial No. 144,535.

*To all whom it may concern:*

Be it known that we, HARRY ESSEX and IRWIN W. HUMPHREY, citizens of the United States, residing at Pittsburgh, in the county of Allegheny and State of Pennsylvania, have invented certain new and useful Improvements in Processes of Purifying Amyl Compounds, of which the following is a specification.

This invention relates to processes of purifying amyl compounds; and it comprises a method of purifying artificial amyl alcohol (fusel oil), amyl acetate, etc., wherein the material is freed of residual halogen, such as chlorin, by the action of sodium; all as more fully hereinafter set forth and as claimed.

The fusel oil recovered in purifying alcohol is a complex mixture but it contains large amounts of various amyl or pentyl alcohols ($C_5H_{12}O$); and it is usually called amyl alcohol. Amyl alcohol and the various derivatives which may be made from it, and particularly amyl acetate, have extensive employment as solvents. Amyl acetate is a particularly good solvent for pyroxylin and is a high priced material.

Because of the high price and the extensive market, considerable work has been done in the matter of producing artificial or synthetic amyl alcohol and amyl acetate. This is done by chlorinating petroleum fractions to make monochlorpentanes or "pentyl chlorids." By replacing the chlorin of these monochlorpentanes by the alcoholic hydroxyl (.OH) or acetyl ($CH_3CO_2$) radical, they may be converted into the corresponding amyl alcohols or amyl acetates. Very many methods have been patented for this purpose; but in a general way it may be said that in making amyl acetate the mixture of crude chlorids obtained by chlorinating a petroleum fraction is caused to react, usually under pressure, with sodium acetate or the like whereby the chlorin is replaced by the acetyl radical ($CH_3CO_2$.) of acetic acid. The chlorinated product from petroleum may of course be purified more or less but it is always a mixture containing several distinct pentyl chlorids and a number of other chlorinated materials. No matter how carefully it may be fractionated by distillation, it is always a complex material. This complex nature is not of particular importance in making commercial amyl acetate for the reason that ordinary amyl acetate is itself a similar complex mixture.

But it is found in practice that the removal of the chlorin from the chlorinated product in making amyl acetate, and also in making amyl alcohol, is never wholly complete; there is always more or less chlorin remaining in the material. It is not known in exactly what form this chlorin occurs; but it is in a form which resists removal by all ordinary means. This will be evident when it is remembered that this residual chlorin is that which has passed unattacked through the chlorin-removing processes incident to the manufacture of amyl acetate and of amyl alcohol. It may be that it is present in the form of di or tri chlorinated bodies. Whatever the state of combination in which this residual chlorin occurs, it is a fact that it is difficult to remove. And for many purposes, it is found that the presence of this residual chlorin, or of the organic bodies containing it, militates against the highest efficiency of amyl acetate and the like for solvent purposes. With a good quality of chlorinated product and after a good and efficient acetylating conversion, there is still left enough residual chlorinated material to make the amyl acetate produced somewhat less desirable as a solvent for pyroxylin. It is a good solvent, but its solvent power is less than it would be but for the presence of this residual chlorin. In some instances its efficiency as a solvent is only about 90 per cent. of that of the same material with the residual chlorin removed. As a solvent for gums, it is much more unfavorably affected by the presence of residual chlorin than in its use as a solvent for pyroxylin or nitrocellulose.

It has been found that this residual chlorin is, as stated, very hard to remove. It is not removed by heating the alcohol with metallic magnesium, with the zinc-copper couple or with a variety of other substances ordinarily found effective in removing chlorin from organic bodies. But it is found that this chlorin yields to, and is removable by metallic sodium.

If the synthetic or artificial amyl acetate or amyl alcohol be heated for a time with a little metallic sodium and then washed with water to free it of salt, alkali, etc., and dried it will be found that its solvent power has been materially improved. The amount of sodium required is that equivalent to the residual chlorin and is not great, being ordinarily, with most of these synthetic products, not more than 1 per cent. or so of the weight of the material.

Any convenient means of heating the material with the sodium may be adopted. It may be done under pressure but this is not ordinarily necessary. A simple heating under a reflux condenser will suffice.

In a typical embodiment of the present invention 125 parts by volume of a synthetic amyl acetate containing 1.2 per cent. of residual chlorin was heated under a reflux condenser with about 1 per cent. of sodium for two hours. The mixture was then cooled and poured into 200 parts by volume of water, separated and dried with calcium chlorid. On refractionation this material had about the boiling point of the original material but had a better odor and was more efficient as a solvent for pyroxylin and gums.

In the art, one of the analytical tests for amyl acetate (a process which is supposed to correspond more or less closely with conditions of use) is to measure the amount of amyl acetate necessary to give complete miscibility between alcohol and gasolene. To make miscible a mixture of 20 cc. of commercial methyl alcohol and 30 cc. of gasolene of 0.712 sp. g. at 20° C. it required 6.47 cc. of the highest grade commercial amyl acetate; the so-called "natural" amyl acetate. Of the synthetic material mentioned above, prior to the treatment with sodium, it required 7.10 cc. After the treatment with sodium 6.48 cc. were required; or substantially exactly the same as was required with the best grade of commercial acetate.

In making comparative tests of the solvent power of the purified and unpurified material, it was found that the same high grade mmercial acetate would dissolve 9.5 grams a particular copal in 50 cc. On the other hand a fair sample of synthetic acetate which still contained 7 per cent. of chlorin would only dissolve 1.44 grams of copal for the same volume of 50 cc. This low grade synthetic material after the sodium treatment dissolved 10 grams of the same copal in 50 cc. In other words its solvent power was now greater than that of the high grade commercial material. Another synthetic acetate sample containing 6.4 per cent. residual chlorin would only dissolve 1.48 grams of copal per 50 cc. while after removing the chlorin by sodium, 50 cc. now dissolved 9 grams.

Instead of metallic sodium, metallic potassium may be used. Metallic calcium, barium and strontium are also applicable but are not as readily used, requiring higher heat and pressure. Still they may be employed.

The present process is quite as applicable to amyl alcohol, amyl formate, and other amyl derivatives made from petroleum products as to amyl acetate.

Where bromin is used as an intermediate in converting petroleum pentanes into derivatives, as in brominating a gasolene fraction to make monobrompentanes and then acetylating, the residual bromin may be removed in the manner hereinbefore indicated for residual chlorin. The presence of bromin in the amyl acetate, etc., is quite as objectionable as that of chlorin.

What we claim is:—

1. The process of purifying synthetic amyl derivatives made from petroleum which comprises heating the same with an alkali metal.

2. The process of purifying synthetic amyl derivatives made from petroleum which comprises heating the same with metallic sodium.

In testimony whereof, we affix our signatures hereto.

HARRY ESSEX.
IRWIN W. HUMPHREY.